(12) United States Patent
Cui et al.

(10) Patent No.: US 11,558,302 B2
(45) Date of Patent: Jan. 17, 2023

(54) DATA TRANSMISSION METHOD AND APPARATUS

(71) Applicants: Huawei Technologies Co., Ltd., Shenzhen (CN); Tsinghua University, Beijing (CN)

(72) Inventors: Yong Cui, Beijing (CN); Lei Zhang, Beijing (CN); Qiaoling Wang, Shenzhen (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 0 days.

(21) Appl. No.: 17/098,030

(22) Filed: Nov. 13, 2020

(65) Prior Publication Data

US 2021/0067453 A1    Mar. 4, 2021

Related U.S. Application Data

(63) Continuation of application No. PCT/CN2019/086028, filed on May 8, 2019.

(30) Foreign Application Priority Data

Sep. 4, 2018  (CN) .......................... 201811026124.1

(51) Int. Cl.
*H04L 47/193*    (2022.01)
*H04L 1/18*      (2006.01)
(Continued)

(52) U.S. Cl.
CPC .............. *H04L 47/193* (2013.01); *H04L 1/18* (2013.01); *H04L 43/0864* (2013.01);
(Continued)

(58) Field of Classification Search
CPC ..... H04L 12/40143; H04L 2012/40215; H04L 2012/40273; H04L 47/193; H04L 1/18;
(Continued)

(56) References Cited

U.S. PATENT DOCUMENTS 7,453,805 B2    11/2008  Velev et al.
2004/0001691 A1    1/2004  Li et al.
(Continued)

FOREIGN PATENT DOCUMENTS

CN    1848810 A    10/2006
CN    102457486 A    5/2012
(Continued)

OTHER PUBLICATIONS

Kim et al.,"TP-UrbanX—A New Transport Protocol for Cognitive Multi-Radio Mesh Networks," 2011 IEEE International Symposium on a World of Wireless, Mobile and Multimedia Networks, total 4 pages (2011).
(Continued)

*Primary Examiner* — Walter J Divito
*Assistant Examiner* — Anthony Luo
(74) *Attorney, Agent, or Firm* — Leydig, Voit & Mayer, Ltd.

(57) ABSTRACT

This application provides a data transmission method and apparatus. The method includes: determining a first sending rate based on a network performance objective of first data and a network status of a first transmission control protocol (TCP) connection of a transport layer protocol, where the first TCP connection is used to send the first data; and sending the first data based on the first sending rate. In this way, network congestion control is more flexible, and TCP-based data transmission efficiency is improved.

14 Claims, 8 Drawing Sheets

(51) Int. Cl.
*H04L 43/0864* (2022.01)
*H04L 43/0882* (2022.01)
*H04L 47/50* (2022.01)
*H04L 47/625* (2022.01)
*H04L 47/10* (2022.01)

(52) U.S. Cl.
CPC .......... *H04L 43/0882* (2013.01); *H04L 47/54* (2013.01); *H04L 47/6255* (2013.01); *H04L 47/10* (2013.01)

(58) Field of Classification Search
CPC . H04L 43/0864; H04L 43/0882; H04L 47/54; H04L 47/6255; H04L 47/10
See application file for complete search history.

(56) References Cited

U.S. PATENT DOCUMENTS

| | | | |
|---|---|---|---|
| 2004/0044783 | A1 | 3/2004 | Nordberg |
| 2008/0159135 | A1* | 7/2008 | Caram .................... H04L 47/50 370/230 |
| 2009/0028062 | A1* | 1/2009 | Meloche ................. H04L 41/12 370/252 |
| 2012/0147744 | A1* | 6/2012 | Lee ....................... H04W 28/02 370/230 |
| 2014/0040693 | A1* | 2/2014 | Kim .................. H03M 13/3761 714/746 |
| 2017/0325129 | A1* | 11/2017 | Zhu ....................... H04L 47/193 |
| 2018/0316617 | A1* | 11/2018 | Lubenski ............... H04W 88/16 |
| 2020/0265305 | A1* | 8/2020 | Budden .................. G06N 3/006 |

FOREIGN PATENT DOCUMENTS

| | | |
|---|---|---|
| CN | 102546832 A | 7/2012 |
| CN | 103188036 A | 7/2013 |
| CN | 105847175 A | 8/2016 |
| CN | 107171969 A | 9/2017 |
| CN | 108235382 A | 6/2018 |
| WO | 2010060106 A1 | 5/2010 |

OTHER PUBLICATIONS

Cardwell et al., "BBR: Congestion-Based Congestion Control," Article development led by queue.acm.org, Communications of the ACM, vol. 60, No. 2, pp. 58-66 (Feb. 2017).

Winstein et al., "TCP ex Machina: Computer-Generated Congestion Control," ACM SIGCOMM Computer Communication Review, pp. 123-134, Hong Kong, China (Aug. 2013).

\* cited by examiner

DATA TRANSMISSION METHOD AND APPARATUS

CROSS-REFERENCE TO RELATED APPLICATIONS

This application is a continuation of International Application No. PCT/CN2019/086028, filed on May 8, 2019, which claims priority to Chinese Patent Application No. 201811026124.1, filed on Sep. 4, 2018. The disclosures of the aforementioned applications are hereby incorporated by reference in their entireties.

TECHNICAL FIELD

Embodiments of this application relate to the field of communication technologies, and in particular, to a data transmission method and apparatus.

BACKGROUND

An increasing quantity of Internet users is accompanied with increasingly serious network congestion. In 1988, Lawrence Berkeley National Laboratory of the University of California proposed a congestion avoidance mechanism in which transmission control is performed by using a sliding window model. A size of a sliding window is a size of a buffer used by a receiver to receive data. A sender may determine, based on the size of the sliding window, a maximum amount of data that can be sent. In addition, congestion occurs when a load loaded into a network exceeds a processing capability of the network. As shown in FIG. 1, a capacity of the network limits a maximum amount of data that can be sent by the sender. Therefore, the sender always maintains sizes of two windows: an acknowledgment window and a congestion window of the receiver, and selects a smaller size of the two windows as a quantity of bytes that can be sent.

With development of Internet, a backbone network, a satellite communications network, and a wireless network with a high bandwidth become common network scenarios. These network scenarios are all characterized by a high bandwidth-delay product, a dynamic network status, and the like, and therefore pose a new challenge to a transmission control protocol (TCP). For a dynamic network scenario having a high bandwidth and a high delay, a congestion control mechanism policy of a conventional TCP protocol is fixed and applicable only to a specific network scenario or traffic distribution. Consequently, a size of a sending window cannot be dynamically adjusted based on a relatively high idle bandwidth. In addition, common indicators for measuring network performance, for example, an available bandwidth, a goodput, a delay, and a packet loss rate dynamically vary with a network status. Especially when a round trip time (RTT) is relatively long, network status information that can be obtained is limited, and a path congestion status and available bandwidth information cannot be obtained in time. Consequently, it is difficult to accurately perform modeling and determine an optimal sending rate.

SUMMARY

Embodiments of this application provide a data transmission method and apparatus, to improve TCP-based data transmission efficiency.

According to a first aspect, a data transmission method is provided and includes: determining a first sending rate based on a network performance objective of first data and a network status of a first transmission control protocol TCP connection, where the first TCP connection is used to send the first data; and sending the first data based on the first sending rate.

The network status of the TCP connection may be a current network status corresponding to the TCP connection, or a corresponding network status when the first data is transmitted by using the TCP connection.

The network performance objective is set, so that an output of a decision not only depends on the network status, but also depends on the network performance objective. In this way, network congestion control is more flexible, the sending rate is better decided, and TCP-based data transmission efficiency is improved.

In a possible design, the network performance objective of the first data is determined based on a characteristic of the first data. In this way, different network performance objectives are determined based on different characteristics of the first data, and then data transmission control is performed based on the network performance objective, to adapt to scenarios of different application requirements.

In a possible design, the network performance objective includes one or more of a goodput objective, a delay objective, and a packet loss rate objective. For example, the network performance objective may be an objective weight ratio of a goodput, a delay, and a packet loss rate. In this embodiment of this application, the network performance objective may be defined by using the goodput, the delay, the packet loss rate, and the like, so that the network performance objective can adapt to more requirements.

In another possible design, the determining a first sending rate based on a network performance objective of first data and a network status of a first TCP connection includes: determining the first sending rate within a specified decision period, the network performance objective of the first data, and the network status of the first TCP connection. In this embodiment of this application, the sending rate can be periodically updated, to reduce a requirement for system performance, and improve stability of data transmission and communication efficiency.

In another possible design, the network status of the first TCP connection is determined based on a received acknowledgment character ACK corresponding to the first TCP connection. In this way, the network status of the TCP connection can be determined and accuracy is higher.

In another possible design, the network status includes a smoothed value of a queue delay, a rate of sending a TCP data packet within a decision period, a rate of receiving a TCP data packet within the decision period, a smoothed value of an RTT, an interval of sending a TCP data packet, and an interval of sending an ACK, where the network status is used to evaluate a delay, a sending interval, a packet loss rate, and a bandwidth. The delay, the sending interval, the packet loss rate, and the bandwidth are more accurately evaluated by using the foregoing parameters, to finally obtain a more proper sending rate, so as to improve data transmission efficiency.

In another possible design, the determining a first sending rate based on a network performance objective of first data and a network status of a first TCP connection includes: determining the first sending rate based on the network performance objective of the first data, the network status of the first TCP connection, and a first global measurement value, where the global measurement value is a measurement value of one or more TCP connections corresponding to a transmit end. The one or more TCP connections may include the first TCP connection. The first global measurement value may be a current global measurement value of the transmit end, or a corresponding global measurement value when the transmit end transmits, by using the one or more TCP connections, data including the first data. In this embodiment of this application, a sending rate may further be determined with reference to a sent global measurement value, so that a determined sending rate is more proper and a network-wide resource can be better used.

In another possible design, the global measurement value includes one or more of the following: log (a goodput of the transmit end/a maximum goodput of the transmit end), log (a minimum RTT of the one or more TCP connections of the transmit end/a smoothed value of a round trip time RTT of the one or more TCP connections of the transmit end), and log (a packet loss rate of the transmit end). A global TCP connection is more accurately evaluated by using the foregoing parameters, to finally obtain a more proper sending rate, so as to improve data transmission efficiency.

In another possible design, before the determining a first sending rate based on a network performance objective of first data and a network status of a first transmission control protocol TCP connection, the method further includes: sending, by the receive end, an ACK used to acknowledge that the TCP connection is to be established; and determining that the network status is an initial network status, and then determining a network status when data is sent for the first time.

In another possible design, before the determining a first sending rate based on a network performance objective of first data and a network status of a first transmission control protocol TCP connection, the method further includes: sending the TCP data packet of the first data to the transmit end by using the first TCP connection; sending, by the receive end, the ACK used to acknowledge that the TCP data packet is correctly received; and determining the network status of the first TCP connection based on the ACK.

In another possible design, sending the first data packet based on the first sending rate by using the first TCP connection includes: determining whether sending of the TCP data packet of the first data is completed; and when the sending of the TCP data packet of the first data is not completed, sending a to-be-sent TCP data packet of the first data by using the first TCP connection based on the first sending rate.

In another possible design, sending the first data packet based on the first sending rate by using the first TCP connection further includes: calculating a maximum sending amount based on the first sending rate; and sending a to-be-sent TCP data packet of the first data by using the first TCP connection based on the first sending rate and the maximum sending amount.

In another possible design, the method further includes: correspondingly storing the network performance objective of the first data, the network status of the first TCP connection, the first global measurement value, and the first sending rate in a database.

In another possible design, a deep reinforcement learning-based rate model includes a policy network and a sending rate decision network; and the determining the first sending rate based on the network performance objective of the first data, the network status of the first TCP connection, and a global measurement value includes: using the network status of the first TCP connection as an input of the policy network, and using an output of the policy network, the network performance objective of the first data, and the first global measurement value as an input of the sending rate decision network, where an output is the first sending rate. In this way, the first sending rate can be determined by using the deep reinforcement learning-based rate model, to better use historical data and improve communication efficiency.

In another possible design, the deep reinforcement learning-based rate model further includes a value network; and the method further includes: determining a loss function value over a value network based on a correspondence between a network performance objective of second data, a network status of a second TCP connection, a second global measurement value, and a second sending rate that are stored in the database; updating the value network based on the loss function value, and determining an updated policy gradient; and updating the policy network and the sending rate decision network based on the updated policy gradient. In this way, a rate model can be optimized based on newly generated data to increase utilization of historical data, so that a determined sending rate is more proper and communication efficiency is higher.

According to a second aspect, a data transmission apparatus is provided and includes: a determining unit, configured to determine a first sending rate based on a network performance objective of first data and a network status of a first TCP connection, where the first TCP connection is used to send the first data; and a sending unit, configured to send the first data based on the first sending rate.

In a possible design, the network performance objective of the first data is determined based on a characteristic of the first data.

In a possible design, the network performance objective includes one or more of a goodput objective, a delay objective, and a packet loss rate objective. For example, the network performance objective may be an objective weight ratio of a goodput, a delay, and a packet loss rate.

In another possible design, the determining unit is specifically configured to determine the first sending rate based on a specified decision network, the network performance objective of the first data and the network status of the first TCP connection.

In another possible design, the network status of the first TCP connection is determined based on a received acknowledgment character ACK corresponding to the first TCP connection.

In another possible design, the network status includes a smoothed value of a queue delay, a rate of sending a TCP data packet within a decision period, a rate of receiving a TCP data packet within the decision period, a smoothed value of a round trip time RTT, an interval of sending a TCP data packet, and an interval of sending an ACK, where the network status is used to evaluate a delay, a sending interval, a packet loss rate, and a bandwidth.

In another possible design, the determining unit is specifically configured to determine the first sending rate based on the network performance objective of the first data, the network status of the first TCP connection, and a first global measurement value, where the global measurement value is a measurement value of one or more TCP connections corresponding to a transmit end.

In another possible design, the global measurement value includes one or more of the following: log (a goodput of the transmit end/a maximum goodput of the transmit end), log (a minimum RTT of the one or more TCP connections of the transmit end/a smoothed value of a round trip time RTT of the one or more TCP connections of the transmit end), and log (a packet loss rate of the transmit end).

In another possible design, the apparatus further includes: a storage unit, configured to correspondingly store the network performance objective of the first data, the network status of the first TCP connection, the first global measurement value, and the first sending rate in a database.

In another possible design, a deep reinforcement learning-based rate model includes a policy network and a sending rate decision network.

The determining unit is configured to: use the network status of the first TCP connection as an input of the policy network, and use an output of the policy network, the network performance objective of the first data, and the global measurement value as an input of the sending rate decision network, where an output is the first sending rate.

In another possible design, the deep reinforcement learning-based rate model further includes a value network. The apparatus further includes an updating unit, where the updating unit is specifically configured to: determine a loss function value over a value network based on a correspondence between a network performance objective of second data, a network status of a second TCP connection, a second global measurement value, and a second sending rate that are stored in the database; update the value network based on the loss function value, and determine an updated policy gradient; and update the policy network and the sending rate decision network based on the updated policy gradient.

According to a third aspect, a network device is provided. The network device includes a transceiver, a processor, and a memory. The transceiver is configured to send and receive data, the memory is configured to store a program, and the processor is configured to execute the program stored in the memory, to control the network device to perform the method in any one of the first aspect or the possible designs of the first aspect.

According to a fourth aspect, a computer-readable storage medium is provided, where the computer-readable storage medium stores a computer program, and when the computer program is executed by the processor, the method in any one of the first aspect or the possible designs of the first aspect is implemented.

According to a fifth aspect, a computer program product including an instruction is provided. When the instruction is run on a computer, the computer is enabled to perform the method according to any one of the first aspect and the possible designs of the first aspect.

According to a sixth aspect, a chip is provided. The chip includes a processor and a memory. The memory is configured to store a program. The processor is configured to execute the program stored in the memory, to perform the method according to any one of the first aspect or the possible designs of the first aspect.

In the embodiments of this application, the sending rate is determined by using the network performance objective and the network status, to optimize determining of the sending rate and improve data transmission efficiency. The network performance objective may be determined based on a characteristic of data that needs to be sent, to adapt to scenarios of different application requirements. Further, by using historical experience, a size of a sending rate that is suitable for the network status and the network performance objective can be obtained, and a slow startup phase of a conventional TCP congestion control algorithm is experienced, so as to increase a goodput of a transmit end, reduce a startup time, and increase a goodput rate.

DESCRIPTION OF EMBODIMENTS

The technical solutions of this application are further described in detail with reference to the accompanying drawings and embodiments as follows:

In the specification, claims, and accompanying drawings of this application, the terms "first", "second", "third", "fourth", and the like (if existent) are intended to distinguish between similar objects but do not necessarily indicate a specific order or sequence. It should be understood that the data termed in such a way are interchangeable in proper circumstances, so that the embodiments of this application described herein can be implemented in orders except the order illustrated or described herein. Moreover, the terms "comprise", "include" and any variants of the terms mean to cover the non-exclusive inclusion, for example, processes, methods, systems, products, or devices that include a list of steps or units are not necessarily limited to those expressly listed steps or units, but may include other steps or units not expressly listed or inherent to these processes, methods, products, or devices.

Figure 1:
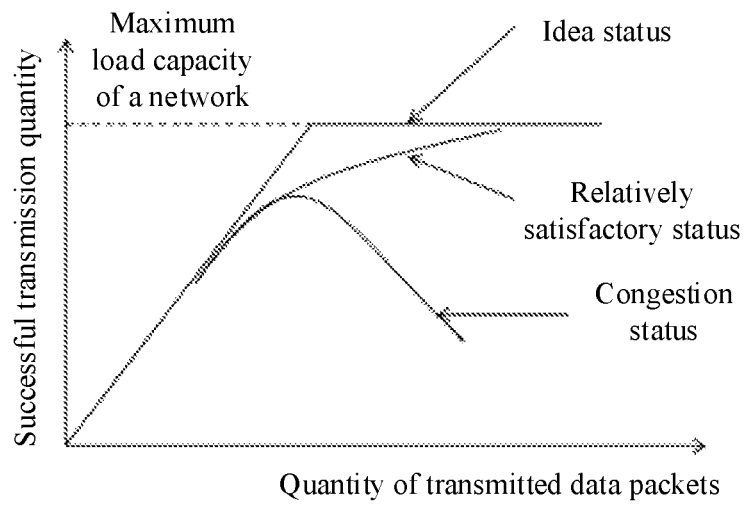
FIG. 1 is a schematic diagram of a congestion mechanism.
Figure 2:
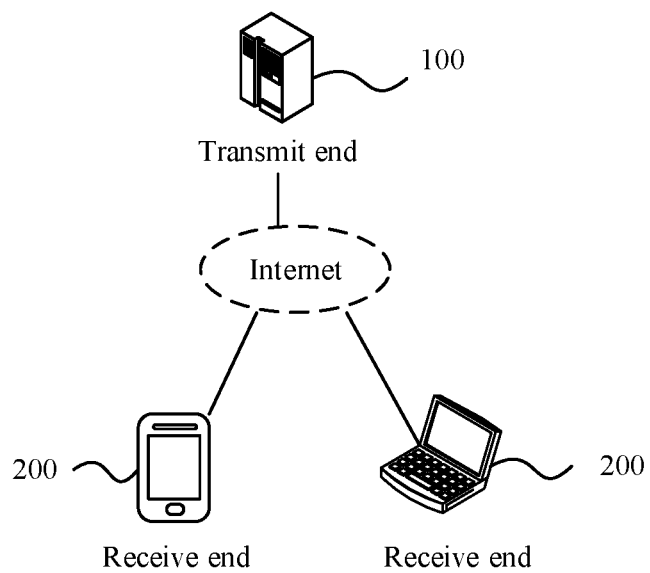
FIG. 2 is a schematic diagram of an application scenario according to an embodiment of this application.

FIG. 2 is a schematic diagram of an application scenario according to an embodiment of this application. As shown in FIG. 2, the scenario includes a transmit end 100 and a receive end 200. The transmit end 100 sends a data packet to a TCP receive end by using M network nodes, where M is an integer greater than or equal to 1. The transmit end 100 may be a server or a proxy server such as a data center node or content delivery network (CDN) node that provides data for a terminal. For example, the transmit end includes but is not limited to a network server (e.g., web server), a video server, an instant messaging server (e.g., IM server), and a game server, and the like. The transmit end 100 provides data such as a network page, a video file, IM communication, and a game for the receive end 200. The receive end 200 may be a terminal that provides functions such as network browsing, video playback, communication, and entertainment for a user, for example, including but not limited to a mobile phone, a computer, a wearable device, and the like. A network node (not shown in the figure) is a data packet forwarding device located between the transmit end 100 and the receive end 200. The network node has an IP address, and supports a transmission control protocol/Internet Protocol (TCP/IP) of a transport layer protocol. The network node may be a network node such as a digital subscriber line access multiplexer (DSLAM), a switch, a router, an optical line terminal (OLT) device, or the like.

Figure 3:
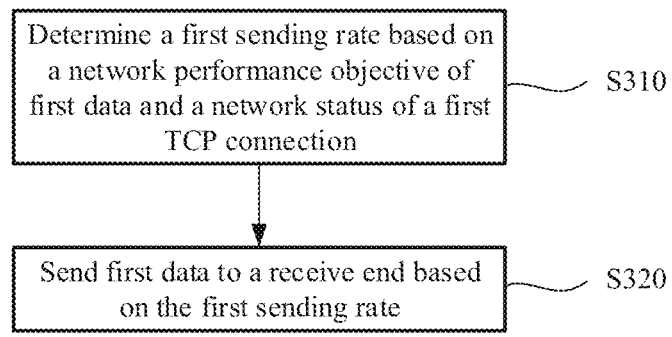
FIG. 3 is a schematic flowchart of a data transmission method according to an embodiment of this application.

FIG. 3 is a schematic flowchart of a data transmission method according to an embodiment of this application. As shown in FIG. 3, the method may specifically include the following steps.

S310. A transmit end determines a first sending rate based on a network performance objective of first data and a network status of a first TCP connection. The network performance objective of the first data may be determined based on a characteristic of the first data, and the first TCP connection is used to send the first data.

The network status of the TCP connection may be a current network status corresponding to the TCP connection, or a corresponding network status when the first data is transmitted by using the TCP connection.

One transmit end may establish a TCP connection to one or more receive ends, and send data by using the TCP connection. The first data may be data that the receive end requests the transmit end to send.

In this embodiment of this application, a correspondence between a characteristic of data and a network performance objective may be predefined. The characteristic of the data may include one or more of a characteristic of an application providing the data, a characteristic of a receive end receiving the data, and a characteristic of the data. Different applications or different services of one application have different requirements for network performance, and a correspondence between a network performance objective and application information such as a type of an application or an application service and an identifier of the application or the application service may be established. For example, a live application has a requirement for low-delay network performance, a cloud disk application has a requirement for high-goodput network performance, and a video application has a higher delay requirement for an online watching service than an offline caching service. Different receive ends have different requirements for network performance, and a correspondence between a requirement of a receive end and a network performance objective may be pre-established. For example, a receive end with relatively good performance may allow a relatively high goodput. Data has different requirements for network performance, and a correspondence between a characteristic of the data and a network performance objective may be pre-established. For example, data with a relatively large amount has a relatively high requirement for a goodput.

Based on this, the transmit end may determine the network performance objective of the first data in a plurality of manners. For example, an application server providing the first data may predefine the network performance objective of the first data, and send the network performance objective of the first data to the transmit end. For another example, the transmit end may determine the network performance objective of the first data based on the characteristic of the first data and a correspondence between a locally predetermined characteristic and a network performance objective. For another example, the transmit end may receive the network performance objective sent by the receive end.

The network performance objective may be used to indicate requirements of one or more of a goodput, a delay, and a packet loss rate. For example, the network performance objective may include one or more of a goodput objective, a delay objective, and a packet loss rate objective. Alternatively, the network performance objective may be a ratio of a goodput objective to a delay objective to a packet loss rate objective, or may be weights of requirements of a goodput, a delay, and a packet loss rate, or may be preferentially one or more of a goodput, a delay, and a packet loss rate.

When the receive end needs to transmit data to the transmit end by using a TCP connection, the receive end may send a data request to the transmit end. After the transmit end receives the data request from the receive end, the transmit end establishes the TCP connection to the receive end, to send the data by using the TCP connection. The first TCP connection may be a TCP connection established when the transmit end transmits the first data to the receive end.

In this embodiment of this application, the network status of the TCP connection is mainly used to evaluate information such as a delay, a sending interval, a packet loss rate, and a bandwidth of the TCP connection. In addition, the transmit end may determine the first sending rate within a specified decision period based on the network performance objective of the first data and the network status of the first TCP connection. In this case, the network status of the TCP connection may be a current network status of the TCP connection within the decision period. The network status of the TCP connection may further be used to evaluate delay jitter, a bit error rate, and the like.

In one example, the network status of the TCP connection may include a smoothed value of a queue delay (used to evaluate a delay), a rate of sending a TCP data packet within a decision period (used to evaluate a sending interval and a packet loss rate), a rate of receiving a TCP data packet within the decision period (used to evaluate a sending interval and a packet loss rate), a smoothed value of a round trip time RTT (used to evaluate a delay), an interval of sending a TCP data packet (used to evaluate a bandwidth) or an interval of sending an ACK (used to evaluate a bandwidth), and the like. The foregoing network status is only an example. In this embodiment of this application, the network status of the TCP connection may further include other network statuses used to evaluate any one of the delay, the sending interval, the packet loss rate, the bandwidth, and the like of the TCP connection. One or more of the other network statuses may be combined with one or more of the foregoing network statuses, to evaluate the delay, the sending interval, the packet loss rate, the bandwidth, and the like of the TCP connection.

In addition, the network status of the TCP connection may be determined based on an ACK sent by the receive end. For example, the transmit end records an ACK arrival time, and simultaneously extracts an ACK sequence number, an ACK acknowledging sequence number, a sending time of a data packet, and an ACK sending time from the ACK. For example, the transmit end extracts the following information from an ACK with a sequence number 1: a sequence number 1, a sending time 129 of the data packet, a total quantity 1436 of sent bytes, a time 62 of acknowledging receiving of a previous data packet, a total quantity 1436 of bytes that have been received and acknowledged, a quantity 1436 of bytes that are currently received and acknowledged, and an ACK sending time 192.

For example, the network status of the TCP connection corresponding to the ACK may be determined at least in the following manner.

The smoothed value of the queue delay may be calculated based on the time of sending the data packet and the time of acknowledging receiving of the previous data packet.

The rate of sending the TCP data packet within the decision period may be determined based on a total quantity of bytes that have been sent within the decision period and the time of receiving the ACK. The decision period may be a period of time from the time of receiving the ACK to a time after a previous decision.

The rate of receiving the TCP data packet within the decision period may be determined based on a total quantity of bytes that have been received and acknowledged within the decision period and the time of sending the ACK. The decision period may be a period of time from the time of sending the ACK to the time after the previous decision.

A smoothed value SRTT of the RTT is calculated as follows: SRTT (new SRTT)=αSRTT (previous SRTT value)+(1−α) RTT (new RTT value). Based on this, an initial value of SRTT is 0. Herein, α is a smoothing factor, and determines a weight occupied by the previous SRTT value, where 0≤α<1. The RTT may be calculated based on the sending time of the data packet and the ACK arrival time.

The interval of sending the TCP data packet is an interval between a current time and a previous time of sending the TCP data packet.

The interval of sending the ACK is an interval between a current time and a previous time of sending the ACK.

When data is sent for the first time by using the TCP connection, because a network status cannot be determined, it can be determined that the network status of the TCP connection is an initial value. The initial value is a preset value. For example, the initial value may be 0.

After the network performance objective of the first data and the network status of the first TCP connection are determined, congestion control is performed based on the network performance objective and the network status. The first sending rate that meets a network performance by using the first TCP connection.

The transmit end may determine the first sending rate in a plurality of manners.

In an example, the transmit end may predetermine a rate model, use the network performance objective of the first data and the network status of the first TCP connection as an input of the predetermined rate model, and use the first sending rate as an output. For example, the rate model may be a deep reinforcement learning-based rate model (for example, a deep deterministic policy gradient (DDPG) algorithm-based model), or may be another machine learning model.

Figure 4:
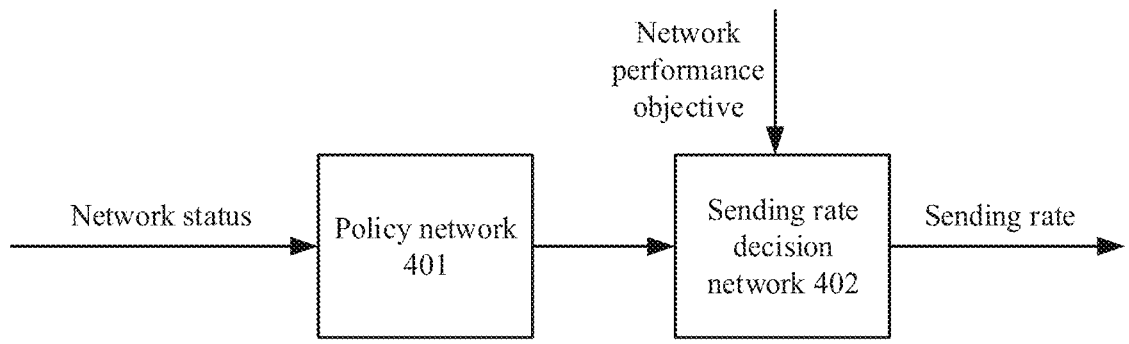
FIG. 4 shows an example of a rate model according to an embodiment of this application.

An example in which the rate model is the deep reinforcement learning-based rate model is used for description. For example, as shown in FIG. 4, the deep reinforcement learning-based rate model includes a policy network 401 and a sending rate decision network 402. When the first sending rate is calculated, the network status of the first TCP connection may be used as an input of the policy network 401, an output of the policy network 401 and the network performance objective of the first data may be used as an input of the sending rate decision network 402, and the first sending rate may be used as an output.

For example, the network status may be represented as S(t). The output of the policy network 401 is A(t), the sending rate is a(t), and the network performance objective is g. Therefore, the policy network 401 may be expressed as A(t)=h(S(t)|β), where β is a group of parameters used to define h, in other words, h varies with β. The sending rate decision network 402 may be expressed as a(t)=f(A(t), g|Φ), where Φ is a group of parameters used to define f, in other words, specific f varies with Φ.

In addition, the obtained rate model may further be optimized based on data generated in a running process of the transmit end. For example, the transmit end may record the determined network performance objective, network status, and sending rate in a database based on a correspondence. For example, the correspondence recorded in the database may be shown in Table 1.

TABLE 1

| Network performance objective 1 | Network status 1 | Sending rate 1 | Global measurement value 1 |
|---|---|---|---|
|  | Network status 2 | Sending rate 2 | Global measurement value 2 |
| Network performance objective 2 | Network status 3 | Sending rate 3 | Global measurement value 3 |
|  | . . . | . . . | . . . |
| Network performance objective 1 | Network status 4 | Sending rate 4 | Global measurement value 4 |
|  | . . . | . . . | . . . |
| Network performance objective 3 | Network status 5 | Sending rate 5 | Global measurement value 5 |
| . . . | . . . | . . . | . . . |

It should be noted that Table 1 is only an example. During specific implementation, the database may include more or less data. The correspondence shown in Table 1 may alternatively be implemented by using a plurality of tables.

Based on a specific time interval or according to a specific rule, for example, each time a specific amount of data is added to the database, the transmit end may update the rate model based on the data in the database. Based on this, this embodiment of this application may further include: determining a loss function value over a value network based on a correspondence between a network performance objective of second data, a network status of a second TCP connection, a second global measurement value, and a second sending rate that are stored in the database; updating the value network based on the loss function value, and determining an updated policy gradient; and updating the policy network and the sending rate decision network based on the updated policy gradient. The correspondence between the network performance objective of the second data, the network status of the second TCP connection, the second global measurement value, and the second sending rate may include a correspondence between the network performance objective of the first data, the network status of the first TCP connection, the first global measurement value, and the first sending rate.

Figure 5:
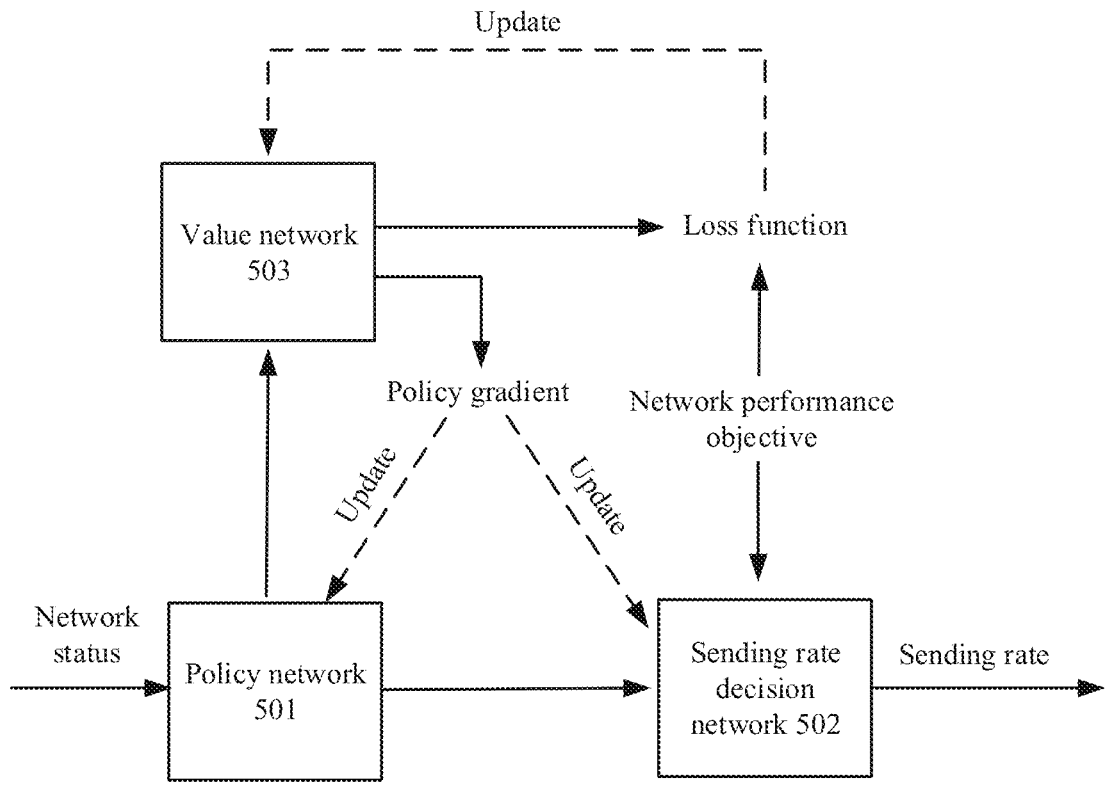
FIG. 5 shows another example of a rate model according to an embodiment of this application.

The DDPG algorithm-based rate model is used as an example for description. For example, as shown in FIG. 5, the DDPG algorithm-based rate model includes a policy network 501, a sending rate decision network 502, and a value network 503. The policy network 501 and the sending rate decision network 502 are same networks as the policy network 401 and the sending rate decision network 402 shown in FIG. 4. Data of a specified size is obtained from the database for training, and a training process includes:

based on a network performance objective g, calculating a loss function according to the following formula by using an output Q(at) of an evaluation network and an output Q(a') of an objective network in the value network:

$$\text{loss}=E[(G(g)+Q(a')-Q(a_t)^2];$$

updating a parameter of the value network 503 based on the loss function, and determining the policy gradient of the value network 503 based on an updated value network 503; and updating parameters of the policy network 501 and the sending rate decision network 502 with reference to the policy gradient of the policy network 501 based on the policy gradient of the value network 503.

In another example, the transmit end may determine the first sending rate based on mapping of the predetermined network status and network performance objective to the sending rate. For example, a plurality of samples of network statuses, network performance objectives, and sending rates may be predetermined. A manner of adjusting the sending rate varies with the network status and the network performance objective. An adjustment manner is modified until an objective function is optimized, and finally the mapping of the network status and the network performance objective to the sending rate is generated.

S320. The transmit end sends the first data to the receive end based on the first sending rate.

After determining the first sending rate, the transmit end may calculate a currently sent maximum sending amount based on the first sending rate, and send the first data to the receive end.

After determining the sending rate of the first data, the transmit end determines whether sending of a TCP data packet corresponding to the first data is completed, and if the sending of the TCP data packet is not completed, sends a to-be-sent TCP data packet of the first data based on the first sending rate by using the first TCP connection.

The transmit end determines whether an ACK of the TCP data packet of the first data is received.

If the transmit end receives the ACK, the transmit end determines, based on the ACK, a network status of data to be sent next time.

If the transmit end does not receive the ACK, the transmit end determines whether sending of a TCP data packet corresponding to a sending window is completed. If the sending of the TCP data packet is not completed, the transmit end continues to send a to-be-sent TCP data packet of the first data. If the sending of the TCP data packet is completed, the transmit end stops sending until the ACK of the TCP data packet of the first data is received.

In this embodiment of this application, the sending rate is determined based on the network performance objective determined based on a characteristic of data that needs to be sent, so as to improve a capability of meeting different network performance requirements, and improve data transmission efficiency. The transmit end directly obtains, by using historical experience, a size of the sending rate that is suitable for the network status and the network performance objective, and does not need to experience a slow startup phase of a conventional TCP congestion control algorithm, so as to increase a goodput of the transmit end, reduce a startup time, and increase a goodput rate.

Figure 6:
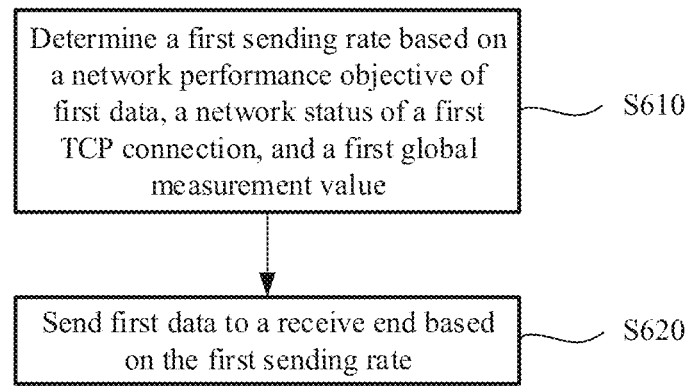
FIG. 6 is a schematic flowchart of another data transmission method according to an embodiment of this application.

FIG. 6 is a schematic diagram of a data transmission method according to an embodiment of this application. In this embodiment, a transmit end may further determine a first sending rate with reference to a global measurement value. The method may specifically include the following steps.

S610. Determine the first sending rate based on a network performance objective of first data, a network status of first TCP connection, and a first global measurement value. The global measurement value is a measurement value of one or more TCP connections corresponding to the transmit end. The one or more TCP connections may include the first TCP connection. The first global measurement value may be a current global measurement value of the transmit end, or a corresponding global measurement value when the transmit end transmits, by using the one or more TCP connections, data including the first data. When the first sending rate is determined based on a decision period, the first global measurement value may be a global measurement value of the transmit end within the decision period.

For the first data, the network performance objective of the first data, the first TCP connection, and the network status of the first TCP connection shown in S610, refer to the foregoing descriptions in S310. Details are not described herein again.

The global measurement value may be used to evaluate all TCP connections of the transmit end. The global measurement value includes one or more of the following: log (a ratio of a goodput of the transmit end to a maximum goodput of the transmit end), log (a ratio of a minimum RTT of the one or more TCP connections of the transmit end to a smoothed value of the RTT of the one or more TCP connections of the transmit end), and log (a packet loss rate of the transmit end).

In addition, the global measurement value may be determined based on an ACK of a global TCP connection of the transmit end. For example, the transmit end records an ACK arrival time, and simultaneously extracts an ACK sequence number, an ACK acknowledging sequence number, a sending time of the transmit end, and an ACK sending time from the ACK. By recording each ACK, the transmit end may determine the global measurement value based on ACKs of a plurality of TCP connections.

The first sending rate may be determined based on the network performance objective of the first data, the network status of the first TCP connection, and the global measurement value in a plurality of manners. A specific description is as follows:

In an example, the transmit end may pre-determine a rate model. The network performance objective of the first data, the network status of the first TCP connection, and the global measurement value are used as an input of the predetermined rate model, and an output is the first sending rate. For example, the rate model may be a deep reinforcement learning-based rate model, for example, a DDPG algorithm-based rate mode, or may be another machine learning model.

Figure 7A:
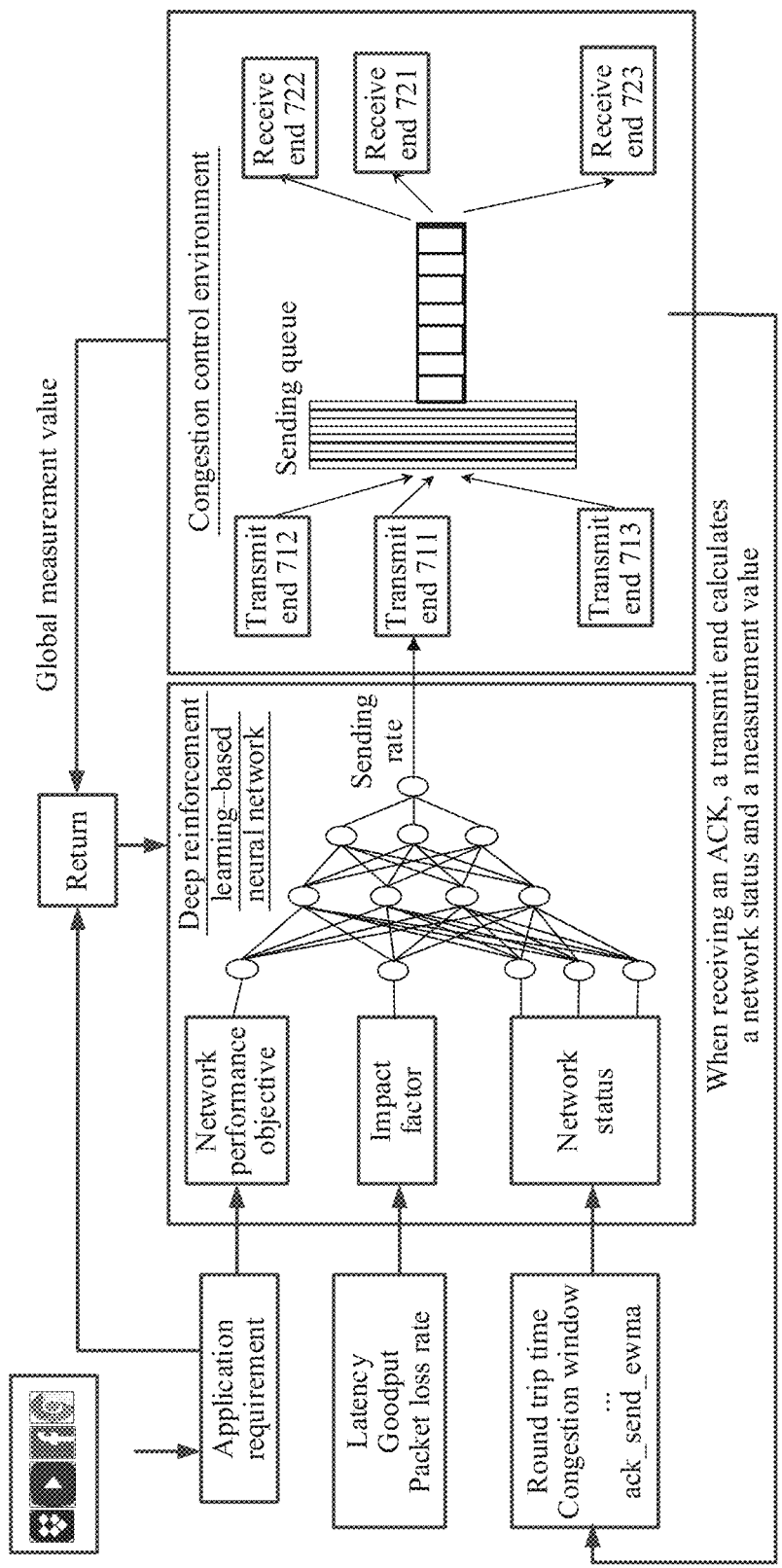
FIG. 7a shows another example of a rate model according to an embodiment of this application.

A DDPG algorithm-based rate model is used as an example for description. For example, as shown in FIG. 7a, a congestion control environment includes transmit ends such as a transmit end 711, a transmit end 712, a transmit end 713, and the like and receive ends such as a receive end 721, a receive end 722, a receive end 723, and the like. Another network element configured to transmit data and an instruction is further included between the transmit end and the receive end. When sending the first data to the receive end 721 by using the first TCP connection, the transmit end 711 may determine the network performance objective based on an application requirement corresponding to the first data. For example, the performance objective may be an objective weight proportion of an impact factor, and the impact factor may include a delay, a goodput, a packet loss rate, and the like. Each time the transmit end 711 receives an ACK, the transmit end 711 calculates a network status and a measurement value corresponding to the ACK, and may obtain a global measurement value based on measurement values of the plurality of TCP connections. For example, with reference to FIG. 7a, the plurality of TCP connections may include two TCP connections: a connection between the transmit end 711 and the receive end 721 and a connection between the transmit end 711 and the receive end 722. When calculating the sending rate, based on a deep reinforcement learning-based rate model, the transmit end 711 may calculate the first sending rate based on the network status of the first TCP connection, the first network performance objective, and the first global measurement value. The transmit end 711 sends data to the receive end 721 based on the first sending rate by using the first TCP connection.

Figure 7B:
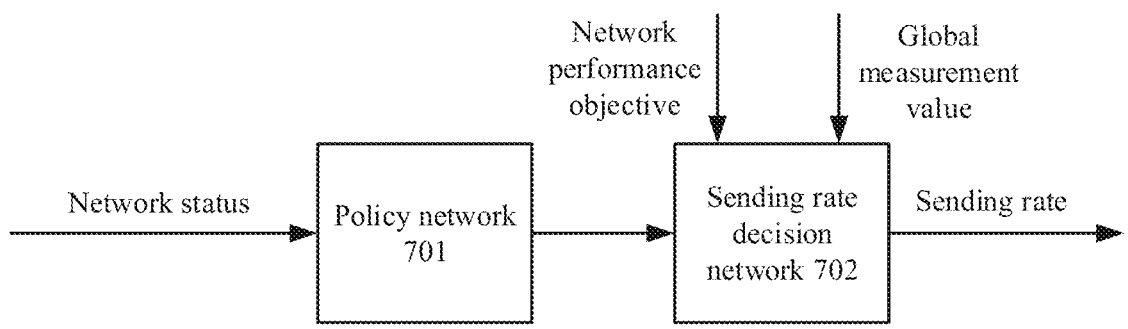
FIG. 7b shows another example of a rate model according to an embodiment of this application.
Figure 8:
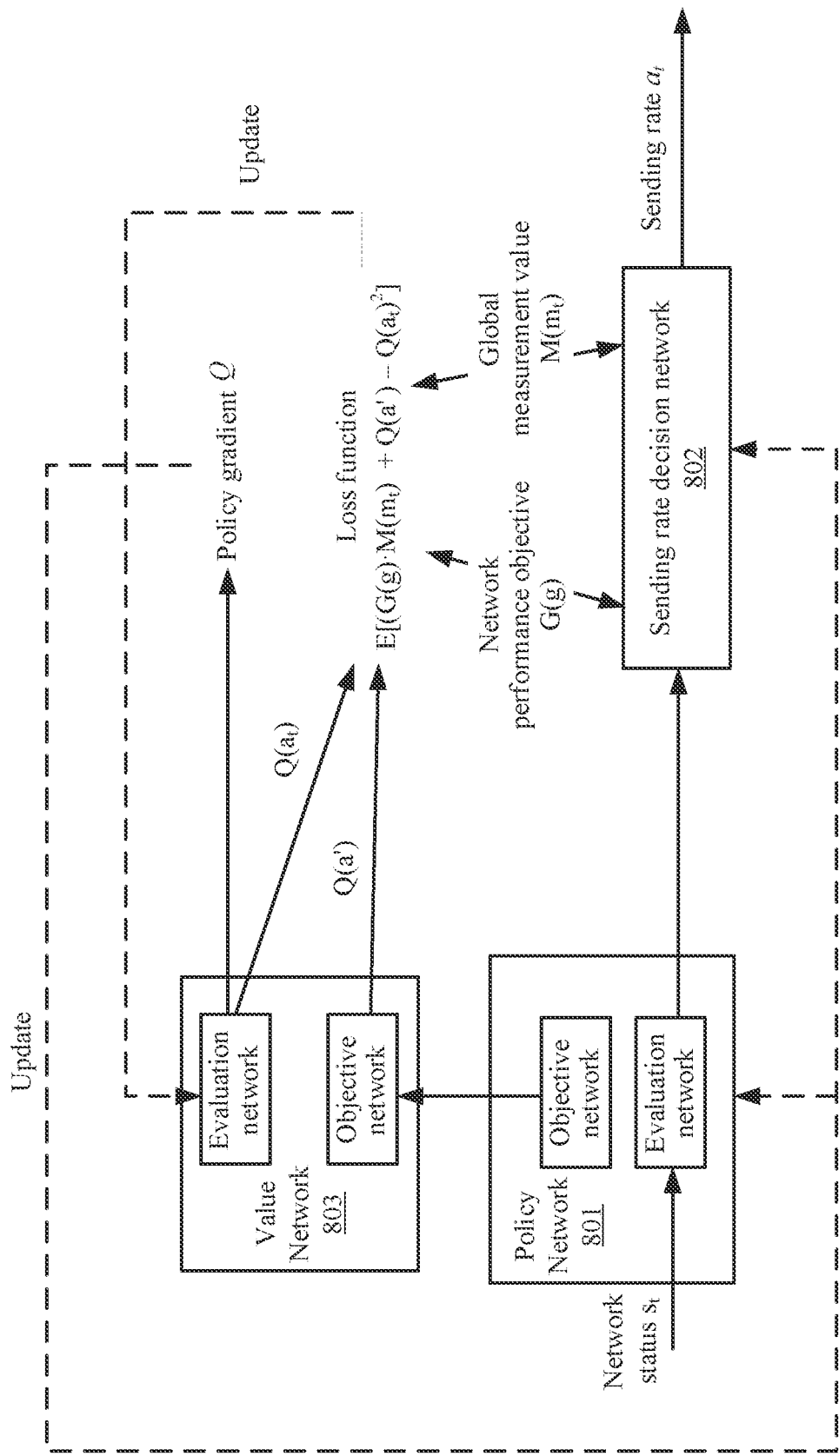
FIG. 8 shows another example of a rate model according to an embodiment of this application.

The deep reinforcement learning-based rate model may be implemented in a plurality of manners. For example, as shown in FIG. 7b, the deep reinforcement learning-based rate model may include a policy network 701 and a sending rate decision network 702. When the first sending rate is calculated, the network status of the first TCP connection may be used as an input of the policy network 701, an output of the policy network 701, the network status of the first TCP connection, and the first global measurement value may be used as an input of the sending rate decision network 702, and an output is the first sending rate.

For example, the network status may be identified as S(t), the output of the policy network 701 is A(t), the sending rate is a(t), the network performance objective is g, and the global measurement value is m(t). The policy network 701 may be expressed as A(t)=h(S(t)|β), where β is a group of parameters used to define h. To be specific, specific h varies with β. The sending rate decision network 402 may be expressed as a(t)=f(A(t), m(t), g|Φ), where Φ is a group of parameters used to define f. To be specific, specific f varies with Φ.

In addition, an obtained rate model may further be optimized based on data generated in a running process of the transmit end. For example, the transmit end may correspondingly store the network performance objective of the first data, the network status of the first TCP connection, the first global measurement value, and the first sending rate in the database. Because the transmit end may provide a plurality of data services for a plurality of receive ends, a local database of the transmit end may store data corresponding to the plurality of TCP connections.

Based on a specific time interval or according to a specific rule, for example, when data in the database increases by a specific amount, the transmit end may update the rate model based on the data in the database.

A DDPG algorithm-based rate model is used as an example for description. For example, the deep reinforcement learning-based rate model includes a policy network 801, a sending rate decision network 802, and a value network 803. The policy network 801 and the sending rate decision network 802 are same networks as the policy network 701 and the sending rate decision network 702 shown in FIG. 7. A specified size of data is obtained from the database for training, and a training processing is as follows:

based on a network performance objective g and a network measurement value m, calculating a loss function according to the following formula and by using an output Q(at) of an evaluation network and an output Q(a') of an objective network in the value network 803:

loss=$E[(G(g) \cdot M(m_t)+Q(a')-Q(a_t)^2]$;

updating parameters of the evaluation network and the objective network in the value network 803: $\theta_\mu$ and $\theta_Q$; and obtaining a policy gradient Q of a value, updating the policy network 801 with reference to the policy gradient of the policy network based on the policy gradient Q of the value, and sending a parameter of the sending rate decision network 802.

The policy network 801 or the sending rate decision network 802 may include the evaluation network with the parameter of $\theta_\mu$ and the objective network with the parameter of $\theta_Q$. An example of updating the policy network 801 is used for description. The policy network 801 includes an evaluation network "$\mu(st|\theta_\mu)$" and an objective network "$Q(st, at|\theta_Q)$", where at represents an output of the policy network 801, st represents a network status, N represents a quantity of training samples, and a function J represents a gradient specific to $\theta_\mu$. A parameter is updated according to the following formula:

$$\nabla_{\theta_\mu} J \approx \frac{1}{N} \sum_t \nabla_a Q(s, a|\theta^Q)\big|_{s=s_t, a=\mu(s_t)} \nabla_{\theta_\mu} \mu(s|\theta^\mu)\big|_{s=s_t}.$$

In another example, the transmit end may determine the first sending rate based on mapping of the predetermined network status and network performance objective to the sending rate. For example, a plurality of samples of network statuses, network performance objectives, and sending rates may be predetermined. A manner of adjusting the sending rate varies with the network status and the network performance objective. An adjustment manner is modified until an objective function is optimized, and finally the mapping of the network status and the network performance objective to the sending rate is generated.

S620. The transmit end sends the first data to the receive end based on the first sending rate.

For step S620, refer to related descriptions in step S320. Details are not described again.

Figure 9:
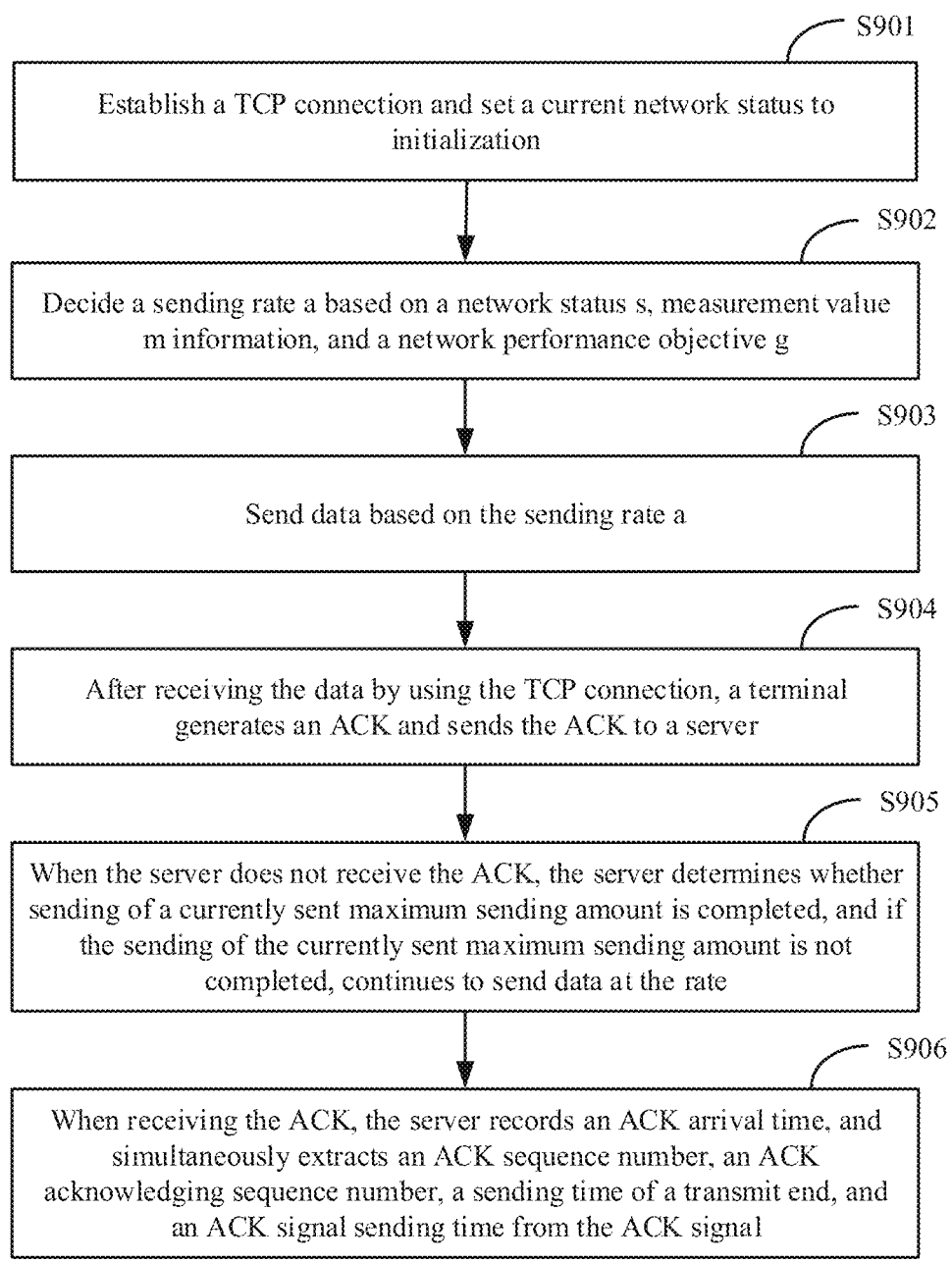
FIG. 9 is a schematic flowchart of another data transmission method according to an embodiment of this application.

FIG. 9 is a schematic diagram of a data transmission method according to an embodiment of this application. As shown in FIG. 9, the method may be deployed in a web server. The network performance objective g may be set to g=(0.7, 0.2, 0.1), to ensure a relatively low delay and allow a specific packet loss rate on a premise that a relatively high goodput is ensured. A decision made on a sending rate of a web server end is based on a performance objective g, and an optimization objective is to increase a goodput of the web server. The performance objective is transferred to a rate calculation engine by using a socket. A database of the web server stores a network status s, a sending rate a, a network measurement value m, and a network performance objective g of a historical TCP flow.

A specific procedure of data transmission is as follows:

S901. When the web server needs to send data to a terminal, the web server first establishes a TCP connection to the terminal, and when receiving an ACK signal that is sent by the terminal and that is used to acknowledge that the TCP connection is to be established, a web server end sets a current network status to initialization. For example, after a TCP connection is established in a 12 Mbps-bandwidth link with a 60-millisecond RTT, a network status is initialized to s=[[0. 0. 0. 0. 0. 0. 0. 0. 0. 0. 0. 0. 0. 0. 0.][0. 0. 0. 0. 0. 0. 0. 0. 0. 0. 0. 0. 0. 0. 0. 0.][0. 0. 0. 0. 0. 0. 0. 0. 0. 0. 0. 0. 0. 0. 0. 0.][0. 0. 0. 0. 0. 0.][0. 0. 0. 0. 0. 0. 0. 0. 0. 0. 0. 0. 0. 0. 0. 0.][0. 0. 0. 0. 0. 0. 0. 0. 0. 0. 0. 0. 0. 0. 0. 0.] 0. 0. 0. 0. 0. 0. 0. 0.]]. Due to a time sequence relationship of the network status, each dimension may obtain 16 time sequence values in this example.

S902. The rate calculation engine is generated based on a deep reinforcement learning technology with multi-objective optimization, and a decision on the sending rate a is made based on the network status s, the measurement value m, and the network performance objective g. A specific calculation of the sending rate a is an output through calculation by the rate calculation engine in a deep reinforcement learning network. The rate calculation engine is a rate model of multi-objective deep reinforcement learning based on a DDPG algorithm, an input of the rate model is the network status s, a current network measurement value m, and the network performance objective g, and an output is a next sending rate: a=2.68 Mbps. A currently sent maximum sending amount is calculated based on a value of a: wnd=a/0.008/1436×RTT.

S903. The web server end determines whether there is data to be sent by using the TCP connection. If no data is to be sent, sending ends. If there is data to be sent, the data is to be sent based on the sending rate a. The sending engine sends corresponding data to a network over a network interface.

S904. After receiving the data by using the TCP connection, the terminal generates an ACK and sends the ACK to the server over the network.

S905. When the server does not receive the ACK, the server determines whether sending of a currently sent maximum sending amount is completed, and if the sending of the currently sent maximum sending amount is not completed, continues to send data at the rate.

S906. When receiving the ACK, the server records an ACK arrival time, and simultaneously extracts an ACK sequence number, an ACK acknowledging sequence number, a sending time of a transmit end, and an ACK signal sending time from the ACK signal.

For example, information shown in Table 2 is extracted from an ACK signal with a sequence number 1.

TABLE 2

| | |
|---|---|
| Sequence number (seq_num) | 1 |
| Time at which data packet is sent (send_ts) | 129 |
| Total quantity of sent bytes (sent_bytes) | 1436 |
| Time of receiving and acknowledging a previous data packet (delivered_time) | 62 |
| Total quantity of bytes that have been received and acknowledged (delivered) | 1436 |
| Quantity of bytes currently received and acknowledged (send_ack_bytes) | 1436 |
| ACK sending time (send_ack_time) | 192 |

The global measurement value m is calculated and stored based on the information about the ACK shown in Table 2. After a new network status is generated and passes normalization processing, s=[[0. 0. 0. 0. 0. 0. 0. 0. 0. 0. 0. 0. 0. 1.41][0. 0. 0. 0. 0. 0. 0. 0. 0. 0. 0. 0. 0. −1.41][0. 0. 0. 0. 0. 0. 0. 0. 0. 0. 0. 0.0. 0. 1.41][0. 0. 0. 0. 0. 0. 0. 0. 0. 0. 0. 0. 0. 1.41][0. 0. 0. 0. 0. 0. 0. 0. 0. 0. 0. 0. 0. 1.41][0. 0. 0. 0. 0. 0. 0. 0. 0. 0. 0. 0. 0.1.41]]. It is determined whether there is an interval of 10 ms from a previous decision to a current decision. If there is not the interval of 10 ms from the previous decision to the current decision, the rate is not updated. If there is the interval of 10 ms from the previous decision to the current decision, the new network status is sent to the rate calculation engine, to calculate a new sending rate a=4.15 Mbps, and then send data in a following round.

The measurement value m is calculated as follows: m=[goodput/max_g_tput, min_rtt/rtt_ewma, loss rate]= [0.68, 0.98, 0.86].

Herein, goodput is a goodput of a current link of the transmit end (the current link of the transmit end may be corresponding to a plurality of TCP connections). Specifically, goodput=a size of a sent data packet (delivered) currently acknowledged by the transmit end/(a current time−a start time of the transmit end).

max_g_put is a current maximum goodput of the transmit end.

min_rtt is a minimum RTT in a current TCP flow of the transmit end, and specifically, rtt=a current time−a data packet sending time.

rtt_ewma is an RTT smoothed value of a current TCP flow of the transmit end, and specifically, rtt_ewma=0.875× rtt_ewma+0.125×rtt.

The loss rate is a current packet loss rate of the transmit end. To be specific, the loss rate=(a size of a sent data packet−a size of an acknowledged data packet)/the size of the sent data packet.

Figure 10:
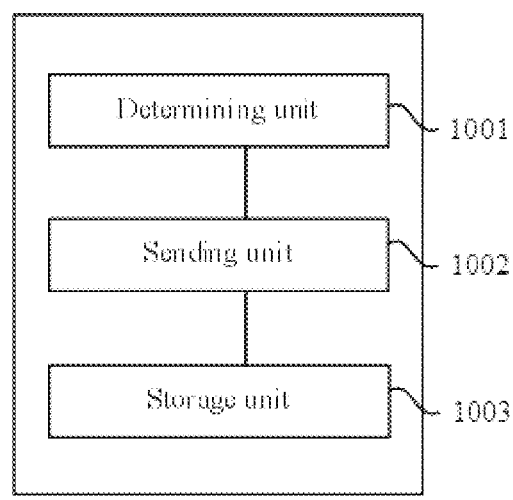
FIG. 10 is a schematic structural diagram of a data transmission apparatus according to an embodiment of this application.

FIG. 10 is a schematic structural diagram of a data transmission apparatus according to an embodiment of this application. The apparatus may be configured to perform the method performed by the transmit end in the embodiment shown in FIG. 3 or FIG. 6. As shown in FIG. 10, the apparatus includes:

a determining unit 1001, configured to determine a first sending rate based on a network performance objective of first data and a network status of a first TCP connection, where the first TCP connection is used to send the first data; and a sending unit 1002, configured to send the first data based on the first sending rate.

In an embodiment, the network performance objective of the first data may be determined based on a characteristic of the first data.

In another embodiment, the determining unit 1001 is specifically configured to:

determine the first sending rate based on a specified decision network, the network performance objective of the first data and the network status of the first TCP connection.

In another embodiment, the network status of the first TCP connection is determined based on a received acknowledgment character ACK corresponding to the first TCP connection.

In another embodiment, the network status includes a smoothed value of a queue delay, a rate of sending a TCP data packet within a decision period, a rate of receiving a TCP data packet within the decision period, a smoothed value of a round trip time RTT, an interval of sending a TCP data packet, and an interval of sending an ACK.

The network status is used to evaluate a delay, a sending interval, a packet loss rate, and a bandwidth.

In another embodiment, the determining unit 1001 is specifically configured to:

determine the first sending rate based on the network performance objective of the first data, the network status of the first TCP connection, and a first global measurement value, where the global measurement value is a measurement value of one or more TCP connections corresponding to the transmit end.

In another embodiment, the global measurement value includes one or more of the following: log (a goodput of the transmit end/a maximum goodput of the transmit end), log (a minimum RTT of the one or more TCP connections of the transmit end/a smoothed value of a round trip time RTT of the one or more TCP connections of the transmit end), and log (a packet loss rate of the transmit end).

In another embodiment, the apparatus further includes:

a storage unit 1003, configured to correspondingly store the network performance objective of the first data, the network status of the first TCP connection, the global measurement value, and the first sending rate in a database.

In another embodiment, a deep reinforcement learning-based rate model includes a policy network and a sending rate decision network.

The determining unit 1001 is specifically configured to: use the network status of the first TCP connection as an input of the policy network, and use an output of the policy network, the network performance objective of the first data, and the global measurement value as an input of the sending rate decision network, where an output is the first sending rate.

In another embodiment, the deep reinforcement learning-based rate model further includes a value network.

The apparatus further includes an updating unit, and the updating unit is configured to:

determine a loss function value over a value network based on a correspondence between a network performance objective of second data, a network status of a second TCP connection, a global measurement value, and a second sending rate that are stored in the database;

update the value network based on the loss function value, and determine an updated policy gradient; and update the policy network and the sending rate decision network based on the updated policy gradient.

Technical features related to the data transmission apparatus have been described in detail above with reference to the accompanying drawings, for example, but not limited to FIG. 3 and FIG. 6. Details are not described herein again.

Figure 11:
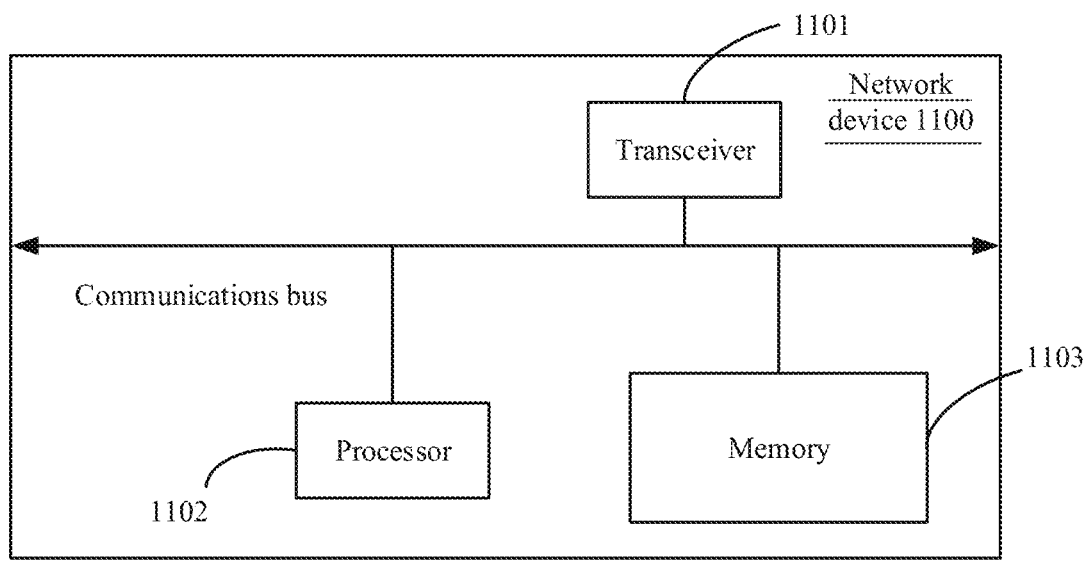
FIG. 11 is a schematic structural diagram of a network device according to an embodiment of this application.

FIG. 11 is a schematic structural diagram of a network device according to an embodiment of the present disclosure. The network device 1100 specifically includes a transceiver 1101, a processor 1102, and a memory 1103. The transceiver 1101, the processor 1102, and the memory 1103 may be connected by using a bus. The network device may be configured to implement a function of the transmit end in the embodiment shown in FIG. 3 or FIG. 6.

The transceiver 1101 is configured to support signal receiving and sending between the transmit end and the receive end or another network element in the foregoing embodiment. For example, the transceiver 1101 may include an Ethernet interface. In a process of communication between the transmit end and the receive end, data and a signaling message are processed by the processor 1102, and sent by the transceiver 1101 to the receive end. Data and signaling from the receive end are received by using the transceiver 1101, and are processed by the processor 1102 to obtain data and signaling to be sent by the transmit end. The processor 1102 may control the network device 1100 to perform a processing process of the transmit end in the embodiment shown in FIG. 3 or FIG. 6 and/or may be used in another process in the technology described in this application. For example, the processor 1102 is configured to perform S310 and S610 in the embodiments shown in FIG. 3 and FIG. 6, and the transceiver 1101 is configured to perform S320 and S620 in the embodiments shown in FIG. 3 and FIG. 6. The memory 1103 is configured to store program code and data of a terminal.

An embodiment of this application provides a chip. The chip includes a processor and a memory. The memory is configured to store a program. The processor is configured to execute the program stored in the memory, to perform the method in the foregoing method embodiment.

All or some of the foregoing embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, the method comprising:

determining a first sending rate based on a network performance objective of first data and a network status of a first transmission control protocol (TCP) connection, wherein the first TCP connection is used to send the first data; and sending the first data based on the first sending rate;

wherein the network performance objective of the first data is based on a characteristic of the first data, wherein the characteristic of the first data comprises a characteristic of an application providing the first data, and wherein the network performance objective indicates one or more requirements corresponding to the characteristic of the application;

wherein the network status of the first TCP connection comprises: a smoothed value of a queue delay, a rate of sending a TCP data packet within a decision period, a rate of receiving a TCP data packet within the decision period, a smoothed value of a round trip time (RTT), an interval of sending a TCP data packet, and an interval of sending an acknowledgement (ACK);

wherein the network status of the first TCP connection is used to evaluate a delay, a sending interval, a packet loss rate, and a bandwidth; and wherein the network performance objective is an objective weight ratio of a goodput, a delay, and a packet loss rate of the first data.

2. The method according to claim 1, wherein the network status of the first TCP connection is based on a received ACK corresponding to the first TCP connection.

3. The method according to claim 1, wherein the determining the first sending rate comprises:

determining the first sending rate based on the network performance objective of the first data, the network status of the first TCP connection, and a first global measurement value, wherein the first global measurement value is a measurement value of one or more TCP connections corresponding to a transmit end.

4. The method according to claim 3, wherein the global measurement value comprises calculation results from one or more of the following expressions using a logarithm function log ( ): log(goodput of the transmit end/maximum goodput of the transmit end), log(minimum RTT of the one or more TCP connections of the transmit end/smoothed value of a round trip time RTT of the one or more TCP connections of the transmit end), or log(packet loss rate of the transmit end).

5. The method according to claim 3, further comprising:
storing the network performance objective of the first data, the network status of the first TCP connection, the first global measurement value, and the first sending rate in a database.

6. The method according to claim 3, wherein a deep reinforcement learning-based rate model comprises a policy network and a sending rate decision network; and the determining the first sending rate comprises:
using the network status of the first TCP connection as an input of the policy network,
using an output of the policy network, the network performance objective of the first data, and the first global measurement value as an input of the sending rate decision network, and
using the first sending rate as an output.

7. The method according to claim 6, wherein the deep reinforcement learning-based rate model further comprises a value network; and the method further comprising:
determining a loss function value over a value network based on a correspondence between a network performance objective of second data, a network status of a second TCP connection, a second global measurement value, and a second sending rate that are stored in a database;
updating the value network based on the loss function value, and determining an updated policy gradient; and
updating the policy network and the sending rate decision network based on the updated policy gradient.

8. A data transmission apparatus, comprising:
a processor, configured to determine a first sending rate based on a network performance objective of first data and a network status of a first transmission control protocol (TCP) connection, wherein the first TCP connection is used to send the first data; and
a transmitter, configured to send the first data based on the first sending rate;
wherein the network performance objective of the first data is based on a characteristic of the first data, wherein the characteristic of the first data comprises a characteristic of an application providing the first data, and wherein the network performance objective indicates one or more requirements corresponding to the characteristic of the application;
wherein the network status of the first TCP connection comprises: a smoothed value of a queue delay, a rate of sending a TCP data packet within a decision period, a rate of receiving a TCP data packet within the decision period, a smoothed value of a round trip time (RTT), an interval of sending a TCP data packet, and an interval of sending an acknowledgement (ACK);
wherein the network status of the first TCP connection is used to evaluate a delay, a sending interval, a packet loss rate, and a bandwidth; and
wherein the network performance objective is an objective weight ratio of a goodput, a delay, and a packet loss rate of the first data.

9. The apparatus according to claim 8, wherein the network status of the first TCP connection is based on a received ACK corresponding to the first TCP connection.

10. The apparatus according to claim 8, wherein the processor is configured to determine the first sending rate based on the network performance objective of the first data, the network status of the first TCP connection, and a first global measurement value, wherein the global measurement value is a measurement value of one or more TCP connections corresponding to a transmit end.

11. The apparatus according to claim 10, wherein the global measurement value comprises calculation results from one or more of the following expressions using a logarithm function log ( ): log (a goodput of the transmit end/a maximum goodput of the transmit end), log (a minimum RTT of the one or more TCP connections of the transmit end/a smoothed value of a round trip time RTT of the one or more TCP connections of the transmit end), and log (a packet loss rate of the transmit end).

12. The apparatus according to claim 10, wherein the processor is further configured to cause the network performance objective of the first data, the network status of the first TCP connection, the first global measurement value, and the first sending rate to be stored in a database.

13. The apparatus according to claim 10, wherein a deep reinforcement learning-based rate model comprises a policy network and a sending rate decision network; and the processor is further configured to:
use the network status of the first TCP connection as an input of the policy network, and
use an output of the policy network, the network performance objective of the first data, and the first global measurement value as an input of the sending rate decision network, wherein an output is the first sending rate.

14. The apparatus according to claim 13, wherein the deep reinforcement learning-based rate model further comprises a value network; and wherein the processor is further configured to:
determine a loss function value over a value network based on a correspondence between a network performance objective of second data, a network status of a second TCP connection, a second global measurement value, and a second sending rate that are stored in the database;
update the value network based on the loss function value, and determine an updated policy gradient; and
update the policy network and the sending rate decision network based on the updated policy gradient.

* * * * *